United States Patent [19]

Cramer

[11] 4,315,955

[45] Feb. 16, 1982

[54] FILLED CREAM, BUTTER-LIKE PRODUCT MADE THEREFROM AND METHOD OF MANUFACTURING THEM

[75] Inventor: Glen G. Cramer, New Brighton, Minn.

[73] Assignee: Madison Creamery, Inc., St. Paul, Minn.

[21] Appl. No.: 128,587

[22] Filed: Mar. 10, 1980

[51] Int. Cl.³ .......................... A23L 1/19; A23D 3/00
[52] U.S. Cl. .................................... 426/585; 426/586; 426/604
[58] Field of Search ............... 426/580, 585, 586, 603, 426/604

[56] References Cited

U.S. PATENT DOCUMENTS

| | | | |
|---|---|---|---|
| 2,526,302 | 10/1950 | Turgasen | 426/603 |
| 3,266,904 | 8/1966 | Duin et al. | 426/604 |
| 3,314,798 | 4/1967 | Graves | 426/586 |
| 3,505,077 | 4/1970 | Bratland | 426/417 X |
| 3,519,436 | 7/1970 | Bauer et al. | 426/603 X |
| 3,746,551 | 7/1973 | McNaught | 426/603 X |
| 3,840,682 | 10/1974 | Kubota et al. | 426/602 X |
| 3,922,376 | 11/1975 | Strinning et al. | 426/603 |
| 3,962,464 | 6/1976 | Sozzi | 426/603 X |
| 4,000,332 | 12/1976 | Strinning et al. | 426/603 |
| 4,051,269 | 9/1977 | Strinning | 426/603 |
| 4,091,121 | 5/1978 | Hawley | 426/603 |

FOREIGN PATENT DOCUMENTS

| | | | |
|---|---|---|---|
| 953601 | 3/1964 | United Kingdom | 426/604 |
| 1066703 | 4/1967 | United Kingdom | 426/585 |

*Primary Examiner*—Robert A. Yoncoskie
*Attorney, Agent, or Firm*—Merchant, Gould, Smith, Edell, Welter & Schmidt

[57] ABSTRACT

A method for producing a solid, butter-like, churned emulsion and the product produced by the method is described. The invention relates to a margarine sometimes called "churned margarine" and contains less than 20% by weight of water dispersed uniformly through a partially hydrogenated vegetable oil fatty phase. Another aspect of the invention relates to a method for preparing a filled cream and the resulting filled cream. The so called "churned margarine" can have low levels of cholesterol and high levels of unsaturation and is produced by churning the filled cream.

11 Claims, No Drawings

FILLED CREAM, BUTTER-LIKE PRODUCT MADE THEREFROM AND METHOD OF MANUFACTURING THEM

TECHNICAL FIELD

This invention relates to a method for producing a solid, butter-like, churned emulsion and the product produced by this method. An aspect of this invention relates to a type of margarine sometimes called "churned margarine", i.e. a solid emulsion containing less than 20% by weight of water uniformly distributed through a continuous fatty phase containing a major amount of partially hydrogenated vegetable oil, which emulsion is obtained by churning a so-called filled cream made by blending a milky phase with the partially hydrogenated vegetable oil. Still another aspect of this invention relates to a method for making a "filled cream" which is relatively stable at refrigeration temperatures (e.g. 0°–15° C.) and the resulting filled cream. Still another aspect of this invention relates to a churned margarine product having a high level of unsaturation, a low level of cholesterol, but also having many of the physical properties of either batch-churned or continuously churned butter.

PRIOR ART

Most conventional margarine is made from vegetable oil which has been at least partially hydrogenated and emulsified with mono- and diglycerides, lecithin, and the like. Typically, margarine or similar butter substitutes contain an aqueous phase blended with the vegetable oil or fat phase. To be accurately described as "margarine", such products should contain less than 20% by weight of water.

Although conventional margarine has been widely accepted as a butter substitute, ordinary consumers and margarine experts alike can sense differences in texture and other properties—not only between butter and margarine generally, but even between different types of margarine. In addition, the nutritional content and biological effects of butter and margarine can be significantly different. Some types of margarine contain no protein or carbohydrates, although they may be high in polyunsaturates and extremely low in cholesterol. Butter contains both protein and carbohydrates, but is relatively high in cholesterol and low in polyunsaturated fatty acid residues. According to the U.S. Department of Agriculture Handbook No. 8, butter contains only about two grams of linoleic acid residues per 100 grams of total product or about 2.35 grams of linoleic acid per 100 grams of fatty phase in the butter. Typical margarines, on the other hand, contain 14 grams of this unsaturated acid per 100 grams product or, assuming 85% fat, about 16.4 grams per 100 grams fatty phase. Most of the fats in butter are $C_4$ through $C_{24}$ triglycerides which are substantially saturated, e.g. glyceryl stearate and the like. In addition, because of its method of manufacture, true butter is an extremely "tight" emulsion, i.e. one in which the aqueous phase containing water and milk solids is very finely and very uniformly dispersed through the generally saturated fatty phase. The milk solids in butter help to contribute the distinctive flavor which can be very difficult to match with conventional margarine. When cooled (e.g. to 4°–8° C.) the composition and structure of butter tend to give it a relatively hard character which may be somewhat inconvenient for spreading but which lends itself very conveniently to modern packaging techniques, wherein a large mass of churned and "worked" butter is formed ("printed") into block-like solids typically weighing from 100 to 500 grams each. (For bakeries and other bulk users of butter, packaging procedures may be quite different, however.) In addition to its hardness at refrigeration temperatures, another property of butter which facilitates its handling and packaging is its waxy character and its slipperiness at the surface.

In the late 1940's, an effort was made by researchers to discover a method for making a butter substitute which would combine some of the advantages of butter with the advantages of margarine and be relatively free of the disadvantages of both. One basic concept developed during this research effort involved the idea of forming an artificial cream containing a fatty phase dispersed in a milky phase. The hope was that the artificial cream could be churned in a manner analogous to a true (dairy) cream until, as in the manufacture of true butter, the fatty phase would "break" or agglomerate, resulting in the formation of macroscopic (e.g. pea-sized) granules which could be "worked" to form a water-in-oil emulsion similar to butter.

It was found that such an artificial cream (known in the art as a "filled cream") could be made in this manner and converted into a butter substitute of the type known as "churned margarine". However, the method steps involved in the formation of the filled cream are complex and difficult to control.

A U.S. Pat. No. 2,526,302, to Turgasen, issued Oct. 17, 1950 is believed to contain a typical disclosure of "churned margarine" and methods for making it. The process described by Turgasen can be briefly summarized as follows:

(a) hydrogenated vegetable oil is mixed with a milk-like phase at moderately elevated temperatures, (b) the fatty phase (the hydrogenated vegetable oil) is dispersed in the milky phase through the use of steam and pressure followed by a partial vacuum, (c) the resulting artificial cream is cooled to a temperature below the solidification or congealing temperature of the fatty phase (e.g. to a temperature below 10° C.), and the cooled, filled cream is churned until "break", i.e. until aggregation of the fat globules, resulting in a reversal of phase relationship, (d) the pea-sized granules obtained after "break" are washed, salted, and worked in the manner of churned butter, thereby obtaining a butter-like product which can be "printed" (run through a block-forming and packaging machine) in a manner similar to true butter.

Despite the fact that the results of Turgasen's research were published in the patent literature in October of 1950, churned margarine made from filled cream appears to have had an almost negligible commercial success, particularly when one considers that churned margarine is potentially far less expensive than true butter and could probably be competitive in cost with conventional margarine. Apparently, Turgasen's work has proved to be difficult to reproduce on a commercial scale, despite efforts by at least one large corporation with expertise in food technology. In relatively recent years, further attempts have been made to produce a well-controlled churned margarine generally along the lines of the Turgasen process. One of the steps taken by various workers in this field has been the stabilization of the filled cream with lipophilic food modifiers or emulsifiers such as those used in the manufacture of conventional margarine, e.g. lecithin and mono- and diglycerides. Still another improvement has involved the use of more sophisticated application of the steam and vacuum treatments, thereby obtaining a more refined oily phase. For example, it has been found that the vacuum treatment can be applied more gradually (e.g. in stages). Further improvements in economics have been made through the careful selection of raw materials for the milky phase of the churned margarine. The milk by-product of batch-churned or continuously-churned butter is sometimes called "buttermilk"—not to be confused with the cultured milk sold to consumers who prefer the distinctive characteristics of this type of milk. In the field of butter manufacture, "buttermilk" is essentially a waste product which contains a relatively small amount of butterfat (typically not more than 1% or, at most, about 1.1% by weight), the butterfat solids being somewhat different from conventional milk solids because of the churning action during butter manufacture. This churning action is believed to break up any fat/protein complexes which tend to occur in natural or whole milk. A typical "buttermilk" contains about 3% by weight of lactose, about 0.3–1% by weight of the churned butterfat (more typically at least 0.5% (by weight), about 0.5 to 1% by weight of ash, and about 2–4% by weight of proteinaceous material. Being substantially a by-product material, most "buttermilk" is dried and sold for use in foods and animal feeds. Accordingly, liquid "buttermilk" from the continuous or batch churns of the butter industry is an economically attractive raw material which helps to keep the cost of churned margarine competitive with conventional margarine. Generally following the principles of churned margarine technology, filled creams of about 30% by weight emulsified fatty phase have been made and converted into a butter-like product on a semi-commercial scale. This butter-like product is initially too soft to be "printed" in the same manner as butter; however, after storage at refrigeration temperatures, some "printing" has been achieved. Unfortunately, the results of "printing" are not uniformly reliable, and some of the product has had to be sold in bulk form. Even more significant, the "break" time of the emulsified filled cream has appeared to be neither consistent nor sufficiently short. Long "break" times in excess of 60 minutes have often been encountered, placing the economics of churned margarine production out of reach. In some instances, the product which "breaks" has lacked the hardness of butter. In other cases, the product has turned rancid in a relatively short time.

In an effort to mitigate these problems, better in-plant humidity control has been used, and churning has been commenced at lower temperatures (as compared to those reported in the Turgasen patent). Despite these modifications and improvements in manufacturing technique, short, consistent "break" times have proved to be elusive, and the rheology of the product obtained after breaking has not been entirely satisfactory for handling and "printing". For example, the product is sometimes too soft and other times lacks the surface slipperiness of butter.

The patent literature relating to the field of margarine manufacture is vast. In addition to the aforementioned Turgasen patent, the following U.S. patents are believed to be representative: U.S. Pat. No. 3,746,551 (McNaught), issued July 17, 1973; U.S. Pat. No. 3,962,464 (Sozzi), issued June 8, 1976; U.S. Pat. No. 4,000,332 (Strinning et al), issued Dec. 28, 1976; U.S. Pat. No. 4,051,269 (Strinning et al), issued Sept. 27, 1977; U.S. Pat. No. 4,091,121 (Hawley), issued May 23, 1978; U.S. Pat. No. 3,266,904 (Duin et al), issued Aug. 16, 1966; U.S. Pat. No. 3,922,376 (Strinning et al), issued Nov. 25, 1975.

Accordingly, churned margarine appears to have the potential of providing a more butter-like taste and texture as compared to conventional margarine, but commercialization of the churned margarine technology has been hampered by the lack of consistent results on a commercial scale. For churned margarine to challenge conventional margarine effectively, the process for making the filled cream and converting it to agglomerates should preferably provide consistent moisture content below 20% by weight, short, consistent break times (preferably less than 60 minutes), consistent texture and taste, good shelf life, "printability" with conventional "soft" printers and preferably also by "hard" printers, good filled-cream stability (i.e. little or no "pre-churning" or premature agglomeration or breaking of the emulsion), and the ease of handling which comes from slipperiness at the exposed surfaces of the solid emulsion product. It is believed to be particularly difficult to obtain short, consistent break times without running the risk of "pre-churning". Pre-churning or premature agglomeration can result in coating of pipes and coolers—at times even to the point of causing a shut-down in the processing equipment. It is believed that total elimination of emulsifiers from the filled cream increases the risk of pre-churning to levels which are unacceptable if the process of making churned margarine is to be practiced on a commercial scale. On the other hand, an incorrectly selected or incorrectly balanced emulsifier system can have undesirable effects upon the final product and unpredictable effects upon the break time.

SUMMARY OF THE INVENTION

It has now been found that a consistently satisfactory solid, butter-like, churned emulsion containing less than 20% by weight of water uniformly distributed through a continuous fatty phase containing a major amount of partially hydrogenated vegetable oil can be obtained by a method comprising the steps of:

(a) forming an emulsified, at least partially pasteurized filled cream of about 25–40% by weight fatty phase content from a mixture comprising the fatty phase, certain emulsifiers compatible with the fatty phase, and a milky phase, the forming step being carried out by
  (1) blending the fatty phase, the emulsifiers, and the milky phase at temperatures above the melting point of the fatty phase,
  (2) subjecting this blend to generally dry steam under superatmospheric pressure to disperse the fatty phase in the milk and provide a degree of pasteurization, and
  (3) subjecting the resulting dispersion to subatmospheric pressure;

(b) churning the emulsified, at least partially pasteurized filled cream until the fatty phase begins to "break" or agglomerate, thereby forming macroscopic agglomerates of a butter-like material; and (c) forming the agglomerates into a solid, butter-like churned emulsion of the type which has been referred to as "churned margarine".

More consistent results are obtained when the butterfat content of the milky phase is greater than about 1.1% by weight, based on the total weight of this phase. Accordingly, if a low-butterfat milk is used in the process, the normally preferred approach is to increase the butterfat content with a suitable dairy product. Butter has been found to be unsuitable for this purpose, and cream is vastly preferred. The emulsifiers are added in amounts sufficient to facilitate emulsification of the fatty phase in the milky phase and to maintain the fatty phase in a generally stably emulsified condition without interfering with the ability of the fatty phase to agglomerate and form macroscopic agglomerates after about 8 to 60 minutes of churning. The preferred emulsifiers are lecithin and vegetable fatty acid mono- and diglycerides. Commercial glycerolyses and hydrolyses of fats and oils or other manufacturing techniques tend to produce mono- and diglyceride mixtures which can be used in this invention, but such mixtures are preferably used in combination with a relatively pure monoglyceride of a vegetable fatty acid, e.g. a monoglyceride containing less than about 10% by weight of diglyceride and/or triglyceride contaminants or impurities. The combined amount of the lecithin, monoglyceride, and diglyceride is preferably less than 1 part by weight for each 100 parts by weight of the partially hydrogenated vegetable oil in the fatty phase, and the ratio of the total weight of monoglyceride emulsifier and diglyceride emulsifier to the weight of lecithin emulsifier is preferably less than about 2.5:1, e.g. less than 2:1.

Stated another way, this invention involves a method for making an emulsified filled cream suitable for use in the manufacture of churned margarine. Typical steps in the manufacture of the filled cream itself include:

(a) blending, at about 40°-60° C., about 40 to 70 parts by weight of partially hydrogenated vegetable oil (preferably soybean oil) and an emulsifying amount of an emulsifier system with each 100 parts by weight of the milky phase, (b) subjecting the resulting blend to generally dry steam under superatmospheric pressure for about 3 to about 5 seconds to disperse the hydrogenated oil in the milky phase, and (c) subjecting the resulting dispersion to subatmospheric pressure to form the resulting emulsified filled cream. The filled cream is an important intermediate product which can, if necessary, be shipped under appropriate conditions to a facility where churning equipment is available. Preferably, however, the filled cream is churned into the butter-like product within the same production plant.

The churned margarine obtained according to this process can be characterized by its taste and texture (which, according to some observers, is virtually indistinguishable from butter), its relatively high iodine number (level of unsaturation) in comparison to butter, its relatively low cholesterol as compared to butter, its excellent behavior in cooking and baking, its long shelf life, its fatty acid profile (which, of course, is quite different from that of butter), its "printability", and various other desirable properties.

DETAILED DESCRIPTION

The broad outline of the process of this invention corresponds substantially to the churned margarine manufacture technique described in the previously-cited Turgasen U.S. Pat. No. 2,526,302. The major departures from the Turgasen technique include the following. First, and perhaps most important, the present invention makes use of an emulsifier system for the filled cream which is finely tuned to achieve a number of objectives, some of which might tend to pull the skilled technician in opposite directions. For example, "pre-churning" can be avoided by lowering the interfacial tension between the water (milky) phase and the oil phase to a value below 10 dynes per centimeter, as explained by Powrie et al in a chapter entitled "Food Dispersions" from *Principles of Food Science*, Part 1, Food Chemistry, Ed. by O. R. Fennema, Marcel Dekker, Inc., N.Y., 1976, particularly pages 544, 547, and 548. The monoglyceride emulsifiers are particularly effective for this purpose. On the other hand, it has now been found that too low an oil/water interfacial tension can lead to inconsistent and/or unduly long break times. Not only can an excessive break time have a drastically unfavorable effect upon production rate of churned margarine, it can also adversely affect the quality of the product emerging from the churn. Second, it is by no means certain that Turgasen contemplates the conditions and emulsification steps which facilitate making a filled cream from a milky phase and partially hydrogenated soybean oil or fatty phases comprising a major amount of hydrogenated soybean oil. Cottonseed oil has been used as an additive to other oils to promote a decrease in set-up time and to improve handling properties. In the present invention, the use of cottonseed oil as an additive or as the principal component of the oily or fatty phase of the filled cream is optional. Pure or substantially pure partially hydrogenated soybean oil can be utilized if desired. Depending upon one's location with respect to vegetable oil or vegetable fat suppliers, the economics of churned margarine production can favor various types of vegetable oil or fat. In the southern United States, for example, cottonseed oil is more likely to be available from local suppliers. In more northern areas, soybean oil is more available. To have a process suitable for use in major butter and margarine manufacturing centers of the midwestern and northern United States, it may be a practical necessity to design a process effective with the more difficult-to-handle vegetable fats such as hydrogenated soybean oil.

As noted previously, the Turgasen technique has been improved by workers in the field of margarine or butter manufacture. Considerable work has been done with emulsifier systems, albeit with spotty and sometimes unsatisfactory results. The pressurized steam treatment, vacuum treatment, cooling, and churning steps of the Turgasen process have also been worked upon and improved, and, generally speaking, these improvements can be useful and beneficial for optimizing the process and product of this invention, even though they form no part of the invention per se. For example, it has been found that the steam temperature of 250° F. (Example 1 of Turgasen) can be lowered somewhat, so long as the steam remains generally dry and heated to a temperature above 100° C. The time required for the steam treatment is variable only within rather narrow limits. Standard flash pasteurization conditions are generally considered to be 132° C. for 5 seconds. To achieve an adequate kill of microorganisms, it is desirable to approach "flash pasteurization" conditions, at least in duration, if not in temperature. (As noted previously, the temperature can actually be lower than 250° F. or 121° C., if desired). A degree of pasteurization can be achieved with as little as 3 seconds of steam treatment at 100°-125° C. For lower steam temperatures, it can be desirable to increase the duration of steam treatment to 5 seconds or more. Extremely lengthy steam treatments which could denature protein are, of course, to be avoided. So long as the steam temperature and pressure during the superatmospheric steam treatment is sufficient to achieve dispersion of the oily or fatty phase in the milky phase and provide a degree of pasteurization, however, the conditions generally utilized in the prior art can be considered adequate. The prior art vacuum conditions and cooling conditions can also be utilized, if sufficiently gradual to provide a well-controlled product with adequate butter-like properties. The filled cream is preferably cooled to refrigeration temperatures (e.g. below 10° C.) before churning. Vigorous agitation in the churn up to and beyond "break" is also preferred. For example, it is preferable to continue churning in high gear until the globules or granules are larger than a millimeter or two (referred to by Turgasen as "pea size" granules).

The major focus of this invention relates to the formulation of the filled cream. A filled cream is typically described in terms of its fatty phase content. Thus, a "30% filled cream" comprises 30% by weight of a fatty phase and 70% by weight of an aqueous or milky phase, the fatty phase being emulsified in the milky phase to provide an essentially oil-in-water (O/W) type of emulsion. It is technically possible to practice this invention by preparing a filled cream containing less than 30% by weight hydrogenated vegetable oil. However, such lower-percent filled creams are less desirable economically, since they produce less churned margarine per churning. If the process of this invention is carried out with a continuous churn on a continuous basis, the lower-percent filled creams are less of a disadvantage. Even with a continuous or semi-continuous process, however, the higher-percent filled creams can be economically advantageous. If the fat content is increased beyond 40% by weight, however, the process becomes more difficult to manage.

The fatty phase, the emulsifiers generally associated with the fatty phase, and the milky phase will now be described in greater detail.

THE FATTY PHASE

Naturally occurring animal and dairy fats are usually highly saturated and hence have low iodine numbers and a very low content of polyunsaturated and monounsaturated carboxylic acid residues. The naturally occurring carboxylic acids generally have even numbers of carbon atoms and straight aliphatic chains attached to the COOH group. The heaviest concentrations of these naturally occurring aliphatic carboxylic acids occur in the $C_4$ to $C_{30}$ range, with most of the higher carboxylic acids having 24 carbons or less. Much of the texture and other characteristics of naturally occurring oils and fats of the triglyceride type are most commonly affected by the content of $C_{12}$ to $C_{20}$ straight-chain aliphatic carboxylic acid residues having even numbers of carbon atoms. The most abundant saturated acids are lauric, myristic, palmitic, and stearic. The most common unsaturated acids from fats and oils typically also occur in the $C_{12}$–$C_{20}$ range of carbon atom content and can have from one to three or more double bonds in the aliphatic chain. One common indicator of unsaturation is the presence of $C_{18}$ unsaturated fatty acid residues, e.g. oleic acid (which has a 9,10-double bond), linoleic acid (which has 9,10- and 12,13-double bonds), and linolenic acid (which has 9,10-, 12,13-, and 15,16-double bonds).

The degree of unsaturation is an important factor in determining the physical as well as chemical properties of both glycerides (e.g. the triglycerides, which are the typical naturally occurring fats and oils) and the fatty acid residues obtained from glycerides. The degree of unsaturation of a fat or oil can be measured by the iodine value, which is the number of grams of iodine that combine with 100 grams of fat or oil. The iodine value of the fat of animals is influenced by the animals' diet. Iodine values of beef tallow can be as low as about 30 and are rarely much above 50. For most types of vegetable oil, the iodine value, prior to any hydrogenation, is typically well above 50 or even 80, e.g. 100–145. (Oils occurring in various types of marine life can have high iodine numbers also.) In addition, there can be a striking influence of climate on the level of unsaturation in oils obtained from vegetation or plant sources, whereby the same type of vegetation could produce an oil with an iodine number varying all the way from, say, 85 to as high as 190.

Dairy cattle tend to produce milk with butterfat solids having very low linolenic acid and linoleic acid residue content. According to the U.S. Department of Agriculture Handbook No. 8, butter contains 2 grams of linoleic acid residue per 100 grams of product. Assuming 15 to 20% moisture in the butter, the linoleic acid content would range from about 2.35 to about 2.5 grams per 100 grams of butterfat. As noted previously, conventional margarine is said to contain 14 grams of linoleic acid per 100 grams of product.

A typical analysis of a churned margarine made according to this invention shows the following fatty acid profile:

| Fatty Acid | Percent by Weight of Fatty Phase |
| --- | --- |
| Myristic | trace |
| Palmitic | 12 |
| Stearic | 7 |
| Oleic | 67 |
| Linoleic | 13.5 |
| Linolenic | 0.3 |

The foregoing percentages are approximations and can vary depending upon the nature and degree of hydrogenation of the vegetable oil used in the process for making the filled cream. By means of thorough hydrogenation, both vegetable and animal oils and fats can be reduced to iodine numbers below 30 and even substantially to zero. However, there is believed to be no advantage in reducing the iodine number of the vegetable fat used in the process of this invention below 50 or even below 60 or 70. Because of the suspected connection between saturated fats and arterial disease, iodine values above 70 are preferred, e.g. 80 or more. At least partial hydrogenation of soybean oil and similar vegetable oils is needed, however, in order to bring the Wiley melting point and the congealing point within the desired range. If the Wiley melting point and the congealing point are too low, the partially hydrogenated material will behave more like an oil than a fat. If, on the other hand, these melting or solidification points are too high, the ultimately obtained churned margarine may be too hard at butter-keeping temperatures and may be difficult to spread when taken directly from the refrigerator. Ideally, a butter substitute product should spread at least as easily as butter when the product is at a temperature of about 5° C. A product which will not spread easily at 10° or 20° C. could be very undesirable. Difficulty in spreading is encountered when the Wiley melting point is 40° C. or higher. Some difficulty may be encountered even with vegetable fat having a Wiley melting point in the range of 35°–40° C. or even slightly lower. The optimum Wiley melting point appears to be below 33° C., and the optimum congeal point appears to be below 30° C., consistent with the need for sufficient hydrogenation to provide a fat-like material rather than an oil which would be liquid at room temperature, e.g. 20°–25° C.

Partially hydrogenated soybean oil having an iodine number below 85 is particularly preferred for use in this invention. This type of vegetable fat is readily available in a high quality form from a number of suppliers. If desired, the partially hydrogenated soybean oil can be blended with other vegetable oils having similar fatty acid profiles, melting point, congeal points, etc. From the standpoint of economics, such blends preferably comprise a major amount of the hydrogenated soybean oil.

THE EMULSIFIER SYSTEM

Lecithin combined with the mono- and diglycerides of $C_{12}$–$C_{22}$ aliphatic carboxylic or fatty acids makes up an emulsifier system which is commonly used in food technology and oftentimes in the manufacture of margarine. Mono- and diglycerides of both animal and vegetable fatty acids have been used in food technology; however, vegetable fatty acid glycerides are preferred in the context of this invention to insure greater shelf life for the churned margarine product. Some workers in the field prefer to refer to these glycerides as "food conditioners" rather than emulsifiers, due to the variety of effects upon food products resulting from the use of these compounds. Although this invention is not bound by any theory, it is believed that the preferred glycerides do, however, serve an emulsifying function in the manufacture of filled cream and the churned margarine made from the cream. For example, it presently appears that partially hydrogenated soybean oil-based filled creams will "pre-churn" at temperatures below about 10° C. in the absence of any deliberately added emulsifiers. (Natural constituents in the milky phase do contribute some emulsifying effects; however, this invention contemplates the deliberate or intentional addition of emulsifiers.)

As is known in the art, mono- and diglycerides can be obtained from triglyceride starting materials. It is difficult to provide a pure monoglyceride or pure diglyceride from the usual starting materials by conventional techniques. However, the mono- and diglycerides can be separated, e.g. by distillation. As a result, mono/diglyceride mixtures having a monoglyceride content ranging from about 40% or less up to 93 or 95% or more can be obtained through purification or separation techniques which shift the mono- or diglyceride content in one direction or another. A mono/diglyceride mixture containing, for example, less than about 10% of the diglycerides can be considered to behave almost in the manner of a pure monoglyceride. Due to the greater hydrophilic character provided by the two free hydroxyl groups, monoglycerides behave differently as compared to diglycerides or even as compared to mono/diglyceride mixtures containing less than, say, 70% by weight monoglyceride. Even pure monoglyceride, however, may lack sufficient hydrophilic character to dissolve or even disperse readily in water. This lack of easy dispersibility in water is particularly true of monoglycerides of $C_{18}$ acids which are mostly or fully saturated. In short, the mono- and diglycerides used in this invention have sufficient lipophilic character to become associated with the fatty phase of the filled cream. A good way to measure the balance between hydrophilic and lipophilic character for emulsifiers of this type is to determine the HLB value, i.e. the hydrophobe-lipophile balance. Glyceride emulsifiers used in this invention typically have an HLB value below 5 and typically above 1.0, e.g. about 2 to about 4.

Distilled monoglycerides which come close to being pure glyceryl monostearate (e.g. 93% of the monostearate or higher) are commercially available. Because of the distillation step, these monoglycerides tend to be free of some of the usual contaminants, including alkaline catalysts, and may be relatively low in unsaturated fatty acid residues, free glycerin, etc. Typical HLB values for these monoglycerides are less than 4.0 but greater than 3.5. Because of the two free hydroxyls, these monoglycerides tend to form micelles in oil and may also bring about gellation of oil when present in high concentrations. Some of the commercially available materials are sufficiently well hydrogenated to have an iodine value well below that of beef fat. Further hydrogenation or selection of more saturated starting materials can reduce the iodine number below 10 and provide a material with a melting range which is primarily or entirely above 50° C. At 50° C., 0.5% by weight of such monoglyceride emulsifiers have the ability to reduce the interfacial tension of a soybean oil-in-water emulsion by more than 5 dynes per centimeter, e.g. from about 29.5 or 30 dynes per centimeter to 20–25 dynes/cm. The $C_{18}$ chain of these glycerides provides adequate oil compatibility, while the two free hydroxyls contribute some affinity for a water phase-despite the relative inability of these compounds and mixtures to disperse readily in water. A suitable distilled monoglyceride is available under the commercial designation "RIKEN Type S (V)", available from the Riken Company of Japan. Like other preferred monoglycerides used in this invention, "RIKEN S (V)" comes very close to being a pure glyceryl monostearate obtained from vegetable oil sources. According to product specification, this commercially available emulsifier or food conditioner contains at least 93% by weight of monoglyceride, substantially the balance of the material being diglyceride.

The mono-/diglyceride mixtures preferred for use in this invention are also obtained from vegetable oil sources and are soluble (above their melting points) in vegetable oil. Typical HLB values for these mixtures are lower than for the relatively pure monoglycerides and can approach, for example, 2.5, depending upon the monoglyceride content. If the monoglyceride content is below about 40% by weight, extremely low HLB values are obtained, e.g. below 2.8 or even below 2.5. As the monoglyceride content is increased to 70% by weight or more, the HLB value approaches that of the pure monoglyceride, e.g. 3.5 or higher. The preferred mono/diglyceride mixtures used as a component of the emulsifier system of this invention contain less than 55% total monoglyceride, e.g. 40–52%. With the significant diglyceride content of these mixtures, they tend to help stabilize the filled cream without unduly lengthening the break time. The monoglyceride content, on the other hand, appears to have a more pronounced effect upon break time. For example, if one part per hundred or more of pure monoglyceride were added to the fatty phase of the filled cream, along with any other emulsifiers which might be present, break times would be totally out of reach of commercial practicality, and the resulting agglomerated material emerging from the churn would bear very little similarity to butter or even conventional margarine. It is considered very surprising that such a small amount of an emulsifier component can have such a drastic effect upon a batch of filled cream.

The iodine value of the mono/diglyceride mixture need not be below that of beef fat or even lard. For example, an iodine value of 60–80 is satisfactory.

Lecithin is well known to food technologists as an edible and digestible surfactant and emulsifier of natural origin. This naturally-occurring emulsifier has been used in the food industry in general and in margarine in particular. Chemically, lecithin is phosphatidylcholine, a mixture of the diglycerides of stearic, palmitic, and oleic acids, linked to the choline ester of phosphoric acid. Commercial grades of lecithin typically contain 2.2% phosphorous. Various commercially available lecithin emulsifiers can be used in this invention, including those obtained from readily available vegetable materials or crops such as soybeans. Naturally-occurring lecithin can include unsaturated $C_{18}$ carboxylic acid residues as well as $C_{20}$ and $C_{22}$ acid residues. Synthetic lecithin has been produced, including synthetic L-alpha-(distearoyl) lecithin and L-alpha-(dipalmitoyl) lecithin. These various lecithins are insoluble in water, but have some hydrophilic character by virtue of the internal salt (choline ester of phosphoric acid) structure, as evidenced by a tendency to swell in water. Typical iodine values for lecithin are in the range of 90–100. To achieve good dispersion or solution of lecithin in vegetable fat, moderately elevated temperatures are preferred.

The amount of total emulsifier system used in the context of this invention (e.g. the amount of a mixture comprising a lecithin component, a mono/diglyceride component, and a relatively pure, e.g. greater than 90%, monoglyceride component) should be carefully controlled. For best results in preparing a stable filled cream with a manageable churn time or break time, the amount of emulsifier system (i.e. deliberately added emulsifiers, exclusive of any naturally-occurring emulsifiers) is less than about 1 part by weight per 100 parts by weight of the partially hydrogenated vegetable oil in the fatty phase. In addition, it is preferred that the ratio of the total weight of monoglyceride emulsifier and diglyceride emulsifier (i.e. mono/diglyceride mixtures, substantially pure monoglyceride, etc.) to the weight of lecithin be less than about 2.5:1. One preferred way to provide these amounts and ratios is to add to each 100 parts by weight of the partially hydrogenated soybean oil the following amounts:

about 0.2 to 0.5 part of the lecithin emulsifier;

about 0.15 to 0.45 part of a mono/diglyceride mixture comprising mono- and diglycerides of vegetable fatty acids (this mixture preferably has an HLB value in the range of about 2.5 to 3.5 and normally contains at least about 30% by weight of the diglyceride); and about 0.06–0.3 part of a purified monoglyceride of a vegetable fatty acid, exclusive of any diglyceride contaminant; thus, for example, to determine the amount of a typical commercial "monoglyceride" emulsifier product, one would typically disregard from about 1 to about 10% by weight of the commercial product, this portion being a diglyceride contaminant or the like.

Thus, for example, the weight ratio of the lecithin emulsifier to the mono/diglyceride mixture can range from about 1:1 to 2:1, and the ratio of the lecithin emulsifier to the purified monoglyceride can range from about 1:1 to 6:1. Particularly good results can be obtained when the amount of the lecithin emulsifier ranges from about 0.25 to about 0.35 part by weight per 100 parts by weight of the partially hydrogenated soybean oil. Still another way of viewing the ratios between the various types of emulsifiers is to provide that at least about one-third (about 33% by weight) of the emulsifier system will preferably be the lecithin, and the balance of the system will be substantially made up of the mono- and diglycerides. (Again, for the sake of clarity, natural substances present in milk serum or the like are not included in this description of the emulsifier system, since these natural substances-including proteins, phospholipids, and the like-are not deliberately added.) Considering this balance of the emulsifier system, which will typically comprise 67% or less of the total system, the monoglycerides and diglycerides will generally be used in roughly equal amounts with variations from equality possible in either direction for either type of glyceride. As noted previously, the break time or churn time of the emulsion can be particularly sensitive to the level of monoglyceride content, and hence this component of the total system will normally be less than 33% by weight, a typical range being 25–33% by weight. The diglycerides will normally not be introduced into the emulsifier system as purified compounds but rather in the form of the aforementioned mono/diglyceride mixture.

When considering the emulsifier system to consist essentially of lecithin+the mono/diglyceride component+the monoglyceride component, optimum ratios by weight include the following (lecithin: mono/diglyceride:monoglyceride) 6:5:4, 6:4:5, 6:5:5, 6:4:4, 6:5:3, and 6:3:3.

The ratios 6:3:4 and 6:3:5 are normally less preferred, since the relatively higher amount of monoglyceride compared to the mono/diglyceride component can cause the emulsifier system to be too hydrophilic for the purposes of this invention. A lecithin:monoglyceride ratio as high as 6:1 can be used when the amount of the mono/diglyceride mixture is greater than the amount of purified monoglyceride. On the other hand, a 6:4:5 ratio works extremely well in practice, since, for some reason, the mono/diglyceride component is not overpowered by the slightly larger monoglyceride component. Excellent results can also be obtained with the 6:5:4 ratio. Stated another way, assuming at least about 33% by weight of lecithin in the total emulsifier system, about 25–33% by weight of each of the aforementioned two glyceride components (mono/di and purified mono) provides optimum results.

THE MILKY PHASE

An objective of the method of this invention is to introduce into the filled cream, and hence the churned margarine, a quantity of natural dairy materials which will help to provide butter-like taste and properties. Among the naturally-occurring materials which may make a contribution to taste and properties are butterfat (sometimes called milkfat) and the diverse group of substances subsumed by the heading "solids-not-fat". Among these non-fat solids are proteins, phospholipids, and carbohydrates. Because of the salt-like structure of some of these materials, there is a significant ash content which typically comprises calcium phosphate. Although this invention is not bound by any theory, it is believed to be important that the fatty solids in the milky phase be in a stably dispersed, oil-in-water type of state rather than in a continuous phase such as may occur in true butter or in water-in-oil emulsions. It presently appears that the highly-dispersed state of the butterfat in buttermilk (the butter churn by-product) offers some advantages over skim milk and whole milk. It is theorized that the churning of butter, which produces the buttermilk by-product, breaks up the complex protein-fat-phospholipid structure of the tiny, substantially colloidal globules in the cream introduced into a continuous or batch churn for making butter. As a result, the proteins and phospholipids are, it is believed, at least somewhat disassociated from these complexes and are more active or more able to contribute stabilizing effects upon a filled cream of this invention and the resulting churned margarine. Except for this apparent disassociation of the complex solids in buttermilk, this churned by-product is similar to low-fat milk typically containing about 0.3 to about 1% by weight of butterfat. It naturally follows from this that low-fat or even skim milk can be used in the process of this invention, provided the butterfat content is adjusted to more than 1.1% by weight using an appropriate source of dispersed or colloidal butterfat solids, e.g. dairy cream having a butterfat content in excess of 10% by weight, e.g. 30 or 40%. So-called whole milk having a butterfat content in the range of about 3 to about 5% by weight can be used in the process without any adjustment in butterfat content; however, whole milk is more expensive than buttermilk, and, surprisingly, does not provide as good a churned margarine as does buttermilk—perhaps because the globules in whole milk are still in the complexed state, as explained previously. It follows that cream of 10-60% by weight butterfat content could also be used as the sole component of the milky phase but would have the same disadvantages as whole milk.

The amount of milk or milk-like ingredients used to make a filled cream of this invention varies in accordance with several factors. Among these factors is the level of milkfat or butterfat in the principal milk or milk-like ingredient and in any ingredients used to adjust the butterfat level. Another factor is the desired weight ratio of milky phase to oily phase. To form a stable oil-in-water (O/W) emulsion, the amount of aqueous phase (in this case the milky phase) should be large enough to insure that it will be continuous. The literature of emulsion chemistry abounds with examples of oil-in-water emulsions where the amount of oily or fatty phase is actually larger than the amount of water phase, but it presently appears that there is no advantage in attempting to form a filled cream containing more than 50% fatty material. A useful filled cream can be made containing 25% by weight of fatty phase content, but the optimum fatty content appears to be in the range of 30 to 40% by weight. This range of fatty content is economically desirable and can be manageable from the standpoint of pre-churning problems and other handling problems, particularly when the emulsifier system is optimized for HLB value and other factors discussed previously. When using either buttermilk or other low-fat milk to make the filled cream, the preferred weight/weight ratio (buttermilk:hydrogenated vegetable oil) is normally within the range of 1:1 to 2:1, the optimum level tending to fall somewhere whithin the range of 1.5:1 to about 1.95:1. The amount of 10-60% butterfat cream added to these two ingredients will of course depend upon the butterfat level of the cream. Given most commercially available cream sources, the amount of cream added will typically be at least 0.3 parts per 100 parts of buttermilk up to about 1 part per 100 parts buttermilk. As a result, the portion of the fatty phase of the ultimately obtained churned margarine product which will comprise butterfat will typically be greater than 1% by weight, preferably in the range of 1.5–5% by weight. It is considered surprising that this relatively small content of butterfat can have such a significant impact upon the properties of the churned margarine. It is also considered advantageous that the amount of butterfat needed to achieve this result is so small, particularly from the standpoint of the resulting low cholesterol and high iodine numbers which characterize churned margarine products of this invention.

OTHER INGREDIENTS

As is known in the art, it can be advantageous to add vitamins, preservatives, microorganism cultures (for flavor), other flavoring items such as salt, and the conventional additives used in the margarine industry. Among the useful preservatives are butylated hydroxyanisole, various benzoates, tocopherols, and the like.

The basic process steps of the invention have already been described in some detail. Except for the formation of the filled cream, these processing steps bear some resemblance to techniques used in the butter industry to make butter by a batch or semi-continuous process. It has also been found that the so-called "chilled buttermilk system" described by Robicheaux in U.S. Pat. No. 3,107,740, issued Nov. 5, 1963 is useful in the manufacture of churned margarine, even though the Robicheaux process was originally developed for the butter industry.

The principle and practice of this invention is illustrated in the following non-limiting Examples wherein all parts and percentages are by weight unless otherwise indicated.

EXAMPLE 1

The partially hydrogenated soybean oil utilized to make the filled cream was obtained from the Honeymead Company of Mankato, Minn., U.S. The Wiley melting point of this hydrogenated material was 88° F. The milky phase was obtained by utilizing buttermilk (a churned by-product) of 1.0% butterfat content. The butterfat level was adjusted upwardly with fresh cream varying from 30 to 40% butterfat. The amounts used of these various components are set forth below.

| | |
|---|---|
| Partially hydrogenated soybean oil: | 235 gallons |
| Buttermilk: | 390 gallons |
| Cream, added to buttermilk: | 22 lbs. |

The emulsifier system used with the foregoing mixture was added to the hydrogenated soybean oil (i.e. before the addition of the buttermilk and cream) and was made up of the following amounts of lecithin, mono/diglyceride mixture, and distilled monoglyceride of at least 93% monoglyceride content:

| | |
|---|---|
| Lecithin: | 6 lbs. |
| Mono/diglyceride mixture (ATMUL 86K, registered trademark of ICI Americas Inc. for mono- and | |

-continued

| | |
|---|---|
| diglycerides with 0.02% butylated hydroxy anisole and 0.01% citric acid added as preservatives, flash point and fire point above 300° F.; melting point, approximately 117° F.; iodine value, approximately 70; total monoglycerides, alpha and beta forms, approximately 48%; HLB value, 2.8; free glycerine, less than 1.5%; free fatty acid, less than 1%; and water, less than 0.5%): | 4 lbs. |
| Distilled monoglycerices ("RIKEN", type S[V], trade designation for vegetable oil-based monoglyceride containing at least 93% monoglyceride content and an iodine value less than 2): | 5 lbs. |

The saturated fat index (SFI) of the partially hydrogenated soybean oil was

| | |
|---|---|
| 10° C. (50° F.): | 28–30 |
| 21° C. (70° F.): | 17.5 minimum |
| 33° C. (92° F.): | 3.5 maximum |

Sodium hydroxide was added to raise the pH of the milky phase in the conventional manner.

A filled cream was made from the foregoing ingredients by first stirring the ingredients together at 46°–60° C. (without necessarily achieving any complete dispersion) and subjecting the resulting blend to steam followed by vacuum and cooling, as in the aforementioned Turgasen U.S. Pat. No. 2,526,302. The temperature of the dry steam was 220° F., and the steam was under 25 lbs. per square inch of pressure. The mixture was subjected to this steam treatment for 4.5 to 5 seconds, followed by release of the pressure in a reduced pressure zone. The resulting well-dispersed product was further treated in a second reduced pressure zone and then cooled very gradually to 46°–48° F. (7.5°–9° C.) for churning, although cooling to 42°–43° F. was also used successfully. The churn was run in high gear (i.e. at 28 revolutions per minute) until "break", which occurred 48 minutes after commencement of the churning. The high gear churning was continued after break until the granules reached pea size. The granules were then treated according to the aforementioned "chilled buttermilk system". The chilled product was tempered at refrigeration temperatures for two days at 40° F. before "printing". The product printed very well. Its initial and final moisture content are reported in the first Table of data in Example 2.

EXAMPLE 2

The purpose of this Example was to investigate the effect of various emulsifier systems upon moisture content and "break" time. In all of the following Tests, the partially hydrogenated soybean oil of Example 1 was utilized. The buttermilk combined with the partially hydrogenated soybean oil contained 0.9 to 1.0% butterfat. In all of the Tests, the amount of partially hydrogenated soybean oil per batch was 235 gallons, the amount of buttermilk was 390 gallons, and NaOH was used to adjust the pH in the usual manner. The temperature of the filled cream entering the churn is normally kept within the range of 46°–48° F. (7.5°–9° C.); however, in Tests A-L this temperature was 42°–43° F. (5.5°–6° C.). The steam treatment in each Test was 4.5 seconds/220° F. (105° C.). Initial moisture content was above 13% but below 16%. Additional moisture (from sprayed buttermilk) was worked into the product, so that the final moisture content was consistently above 15% but below 19%.

EFFECT OF EMULSIFIER SYSTEM ON CHURN TIME

| Test | Added Cream, lbs. | Percent Butterfat | Added Lecithin, lbs. | Added Mono/Diglyceride Mixture, lbs. | Added Monoglyceride, lbs. | Churn Time, Minutes | Moisture, initial % | Moisture, Final % |
|---|---|---|---|---|---|---|---|---|
| Example 1 | 22 | 40 | 6 | 4 | 5 | 48 | 14.4 | 16.5 |
| A | 17 | 40 | 6 | 3 | 3 | 25 | 14.2 | 16.4 |
| B | 17 | 40 | 6 | 5 | 3 | 33 | 15.3 | 17.8 |
| C | 17 | 40 | 6 | 5 | 3 | 32 | 14.3 | 17.9 |
| D | 15 | 43 | 6 | 6 | 1 | 11 | 13.8 | 15.3 |
| E | 16 | 40 | 6 | 7 | 1 | 9 | 14.3 | 16.5 |
| F | 16 | 40 | 6 | 8 | 1 | 10 | 14.0 | 16.9 |
| G | 16/11.5 | 43/56 | 6 | 5 | 5 | 89 | 14.4 | 16.6 |
| H | 24 | 56 | 6 | 6 | 5 | 63 | 14.6 | 16.5 |
| I | 24 | 56 | 6 | 5 | 4 | 49 | 15.0 | — |
| J | 24 | 56 | 6 | 5 | 3 | 54 | 14.6 | 16.5 |
| K | 24 | 56 | 6 | 6 | 3 | 36 | 15.1 | 16.6 |
| L | 24 | 56 | 6 | 5 | 4 | 45 | 15.3 | 16.5 |

Assuming for the sake of simplicity that the monoglyceride component is virtually pure monoglyceride and the mono/diglyceride mixture contains at least 40 wt.-% monoglyceride, the combined diglyceride and monoglyceride amounts vs. churn time would be as follows:

| Test | Diglyceride lbs. | Diglyceride phr* | Combined Monoglyceride lbs. | Combined Monoglyceride phr* | Break Time |
|---|---|---|---|---|---|
| Ex. 1 | 2.4 | 0.13 | 6.6 | 0.37 | 48 |
| A | 1.8 | 0.10 | 4.2 | 0.24 | 25 |
| B | 3 | 0.17 | 5 | 0.28 | 33 |
| C | 3 | 0.17 | 5 | 0.28 | 32 |
| D | 3.6 | 0.20 | 3.4 | 0.19 | 11 |
| E | 4.2 | 0.23 | 3.8 | 0.22 | 9 |
| F | 4.8 | 0.27 | 4.2 | 0.24 | 10 |
| G | 3 | 0.17 | 7 | 0.40 | 89 |
| H | 3.6 | 0.20 | 7.4 | 0.42 | 63 |
| I | 3 | 0.17 | 6 | 0.34 | 49 |
| J | 3 | 0.17 | 5 | 0.28 | 54 |
| K | 3.6 | 0.20 | 5.4 | 0.31 | 36 |

-continued

| Test | Diglyceride lbs. | phr* | Combined Monoglyceride lbs. | phr* | Break Time |
|---|---|---|---|---|---|
| L | 3 | 0.17 | 6 | 0.34 | 45 |

*parts per 100, based on 100 parts hydrogenated soybean oil.

Thus, the optimum range of total monoglyceride content appears to be about 0.25 (preferably 0.28) to about 0.4 phr, and the optimum diglyceride content appears to be somewhere within the range of about 0.1 to about 0.3 phr. Both of these ranges assume a lecithin content of 0.34 phr. Accordingly, the total emulsifier system, including lecithin, would amount to less than 1.5 phr and normally less than 1.0 phr, since the ideal break time is in the range of 25-50 minutes. The optimum total of the monoglycerides and diglycerides would then be less than 0.5 phr.

What is claimed is:

1. In a method for producing a solid, butter-like, churned emulsion containing less than about 20% by weight of water distributed through a continuous fatty phase, comprising the steps of
   (a) preparing a mixture comprising vegetable fat and milk,
   (b) subjecting the mixture resulting from step (a) to steam under superatmospheric pressure to disperse the vegetable fat in the milk followed by subjecting said dispersion to subatmospheric pressure to form an emulsified filled cream, and
   (c) cooling the filled cream to a temperature below the solidification temperature of the vegetable fat, and churning the cooled, filled cream in a churning zone until the dispersed vegetable fat begins to agglomerate, thereby forming macroscopic agglomerates of a butter-like material and forming said agglomerates into said solid butter-like emulsion;
   the improvement which comprises:
   controlling the timing of the forming of said agglomerates to a duration within the range of 8 to 60 minutes by including within said filled cream a combination of emulsifiers which comprises, per 100 parts by weight of said vegetable fat,
   about 0.2-0.5 part of a lecithin emulsifier,
   about 0.15-0.45 part of a mono-diglyceride mixture comprising mono and diglycerides of $C_{12}$-$C_{22}$ vegetable fatty acids, said mixture having an HLB value in the range of about 2.5-3.5 and containing at least about 30% by weight of diglyceride, and
   about 0.06-0.3 part of a purified monoglyceride of a $C_{12}$-$C_{22}$ vegetable fatty acid, exclusive of any diglyceride contaminant thereof.

2. A method according to claim 1 wherein the milk used in said step (a) comprises the milk by-product of butter manufacture having a measurable butterfat content not exceeding about 1% by weight.

3. A method according to claim 1 wherein said vegetable fat is hydrogenated soybean oil having an iodine number above 50 and below about 85.

4. A method according to claim 1 wherein the weight ratio of said lecithin emulsifier to said monodiglyceride mixture ranges from about 1:1 to 2:1 and the ratio of lecithin emulsifier to said purified monoglyceride is about 1:1 to 6:1.

5. A method according to claim 4 wherein the amount of said lecithin emulsifier ranges from about 0.25 to about 0.35 part by weight per 100 parts by weight of said partially hydrogenated soybean oil.

6. A method according to claim 1 wherein the HLB value of said monoglyceride emulsifier and said mixed mono and diglyceride emulsifier is less than about 5.

7. The solid, butter-like product made according to the process of claim 1.

8. In a method for making a filled cream, suitable for use in the manufacture of a solid, butter-like, churned emulsion, comprising the steps of:
   (a) preparing a mixture comprising vegetable fat and milk, and
   (b) subjecting the mixture resulting from step (a) to steam under superatmospheric pressure to disperse the vegetable fat in the milk followed by subjecting said dispersion to subatmospheric pressure to form an emulsified filled cream, wherein the improvement comprises:
   preparing said filled cream of such stability that agglomeration of said cream can be effected in not greater than 60 minutes of churning, said preparing being carried out by including in said filled cream a combination of emulsifiers which comprises, per 100 parts by weight of said vegetable fat,
   about 0.2-0.5 part of a lecithin emulsifier,
   about 0.15-0.45 part of a mono-diglyceride mixture comprising mono and diglycerides of $C_{12}$-$C_{22}$ vegetable fatty acids, said mixture having an HLB value in the range of about 2.5-3.5 and containing at least about 30% by weight of diglyceride, and
   about 0.06-0.3 part of a purified monoglyceride of a $C_{12}$-$C_{22}$ vegetable fatty acid, exclusive of any diglyceride contaminant thereof.

9. A filled cream made according to the process of claim 8.

10. A method according to claim 8 wherein said filled cream is made into a solid, butter-like product by:
    (c) churning said filled cream in a churning zone at least until its emulsified state breaks, 25-50 minutes after commencement of churning, and
    (d) obtaining said solid, butter-like product from said churning zone.

11. A method according to claim 10 wherein the lecithin emulsifier is obtained from soybeans.

* * * * *